(12) United States Patent
Shimokoshi et al.

(10) Patent No.: US 6,747,833 B2
(45) Date of Patent: Jun. 8, 2004

(54) MAGNETIC DISK DRIVE WITH A HEAD OSCILLATION FUNCTION AND THE CONTROL METHOD THEREOF

(75) Inventors: Masayoshi Shimokoshi, Odawara (JP); Takeshi Doi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 09/887,064

(22) Filed: Jun. 25, 2001

(65) Prior Publication Data

US 2002/0089778 A1 Jul. 11, 2002

(30) Foreign Application Priority Data

Nov. 17, 2000 (JP) ........................... 2000-355642
Apr. 11, 2001 (JP) ........................... 2001-112163

(51) Int. Cl.[7] ............................................. G11B 5/596
(52) U.S. Cl. ................. 360/77.02; 360/78.04; 360/78.05; 360/78.08
(58) Field of Search ................ 360/77.06, 77.02, 360/78.04, 78.05, 78.08

(56) References Cited

U.S. PATENT DOCUMENTS 4,819,103 A * 4/1989 Okamura .................... 360/51
5,859,738 A * 1/1999 Forehand et al. ............. 360/75
6,321,040 B1 * 11/2001 Wess et al. .................. 396/311

FOREIGN PATENT DOCUMENTS

| GB | 2 340 290 A | 2/2000 |
| JP | 10-149524 | 6/1998 |
| JP | 2000-57716 | 2/2000 |

* cited by examiner

Primary Examiner—David Hudspeth
Assistant Examiner—Mitchell Slavitt
(74) Attorney, Agent, or Firm—Antonelli, Terry, Stout & Kraus, LLP

(57) ABSTRACT

The position information of the magnetic head is generated also from the data area to improve the positioning accuracy. The magnetic disk drive has a function of oscillating the magnetic head in the radial direction in the data area at a specific frequency and a function of detecting a read signal during the execution of the oscillation function and detects position information of the magnetic head from the detected read signal. The magnetic head position control can be performed in the data area. The magnetic head position signal not dependent on the frequency of a sampling signal generated from the servo information area can be generated. This in turn improves the data recording density and allows a highly precise position control of the magnetic head, thus improving the reliability of the magnetic disk drive.

30 Claims, 16 Drawing Sheets

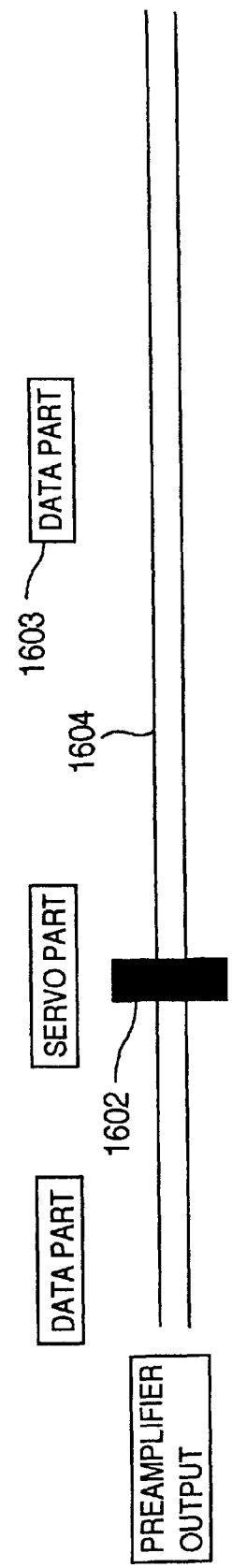

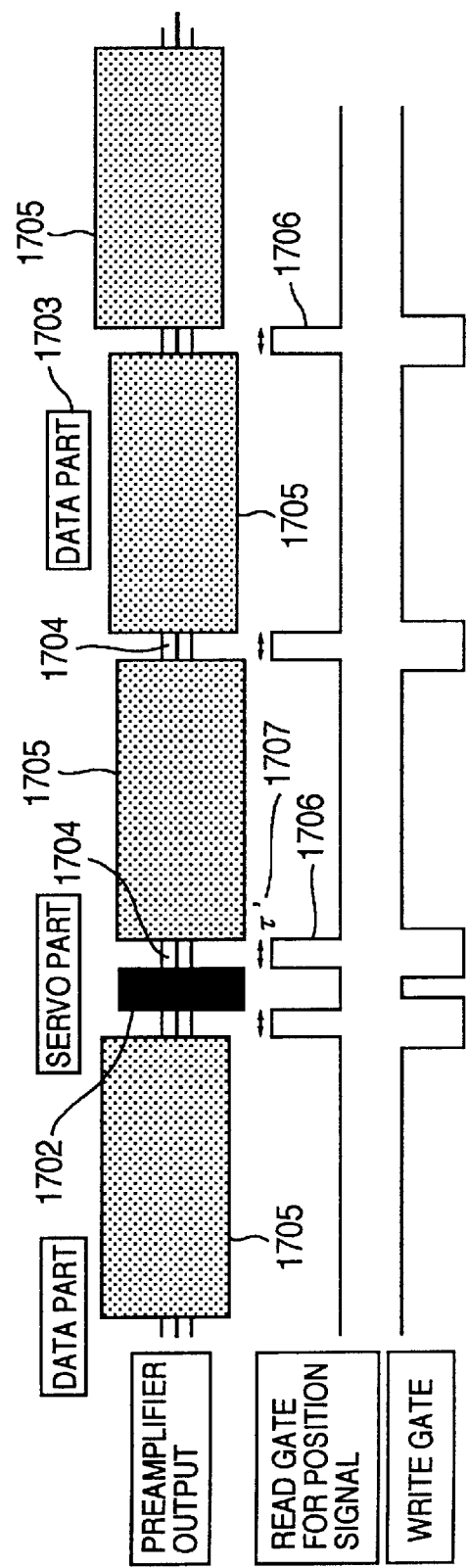

MAGNETIC DISK DRIVE WITH A HEAD OSCILLATION FUNCTION AND THE CONTROL METHOD THEREOF

BACKGROUND OF THE INVENTION

The present invention relates to a magnetic disk drive and more particularly to a magnetic head positioning technique in a high track density.

In conventional magnetic disk drives, a magnetic head to write and read information is disposed above a magnetic disk medium used to store information and is supported on an actuator and moved in a radial direction from one track to another on the magnetic disk medium. Position information to position the magnetic head at a target track is recorded as servo information on the magnetic disk medium. The servo information is normally recorded at locations different from those of data or information stored by the user. The magnetic head detects this servo information at predetermined intervals. The magnetic disk drive locates a target track based on the detected servo information and performs control to place the magnetic head at a particular position. That is, a position signal detected by the magnetic head must include a position signal that is obtained by reading the servo information. Only when the magnetic head flies over the servo information area, can the position of the magnetic head be determined. The magnetic head cannot obtain information about its position when the head is moving over a data area. For this reason, if the magnetic head 101 should suddenly deviate from the correct position while reading data from a data area, for example, the position deviation cannot be detected making it impossible to prevent a data error.

As the servo information increases, the time interval at which to detect the position signal becomes short and the positioning can be made with higher accuracy. When the track density is to be increased, the positioning control requires higher precision and it is common practice to increase the amount of servo information.

A track offset can be detected by comparing amplitude values of a plurality of burst signals recorded in the servo information and has conventionally been detected to perform the positioning control. The track offset refers to a distance by which the center of the magnetic head is deviated from the center of a target track during reading or writing. Hence, when a track offset occurs when the magnetic head is not in the servo information area but in the data area where a signal corresponding to the data is stored, the amplitude of the read signal decreases, causing such troubles as an increased bit error rate. The larger the track offset, the greater the changes of these values are.

The conventional technique has the following problems.
1) For a more precise positioning control, the servo information needs to be increased, which in turn increases the servo information areas 302 (FIG. 3). However, because the servo information and data are recorded on the same plane, an increase in the servo information results in a decrease in the data area 303 and therefore the storage capacity of information written in the magnetic disk medium.

A technique for generating an index sector pulse signal in the data area is disclosed in Japanese Patent No. 3042790.

2) Another problem is that in the method of detecting the position signal representing the position of the magnetic head from only the servo information, the position signal cannot be detected when the data is read or written. Hence, in a system where the actuator is controlled based on the servo information, when vibrations or impacts having frequencies higher than a sampling frequency of the servo information is applied as disturbance to this servo control system, the positioning control cannot be performed in principle, leading to data errors. To solve this problem requires increasing the sampling frequency of the servo information. As described above, however, this reduces the data area 303 and therefore the data storage capacity of the magnetic disk drive.

In other words, the problem that needs to be addressed is that the only time the position of the magnetic head can be detected is when the magnetic head flies over the servo information area 302 from which the servo information can be read and that the magnetic head 101 (FIG. 10) cannot obtain information on its position when it is over the data area 303. Thus, when the magnetic head 101 is over the data area, as when it is reading data, if the magnetic head 101 suddenly deviates from its correct position, this deviation cannot be detected.

3) Further, the track offset on the magnetic disk medium can occur in either direction toward an outer circumferential side or an inner circumferential side. So, if the occurrence of the track offset can be detected and its absolute value estimated, the direction of track offset cannot be determined, making it difficult to use the track offset as an object to be monitored. For example, FIG. 11 shows how the read signal of the magnetic head 101 of the magnetic disk drive changes with respect to the track offset. That is, when the magnetic head is positioned at the track center, the output value of the information read signal is maximum. When the magnetic head is deviated from the center, the output value decreases. When it is completely off track, the output value is shown to be zero.

SUMMARY OF THE INVENTION

The magnetic disk drive has a function to oscillate the magnetic head when it is moving over the data area and a function to detect a read signal when oscillating the magnetic head and, from the detected read signal, locate the position of the magnetic head. The magnetic head is then controlled to be moved to a target track.

The oscillation refers to the magnetic head making periodic motion relative to the head suspension, slider or magnetic disk medium. The direction of oscillation of the magnetic head need only be roughly in a radial direction of the magnetic disk medium and some deviations are permitted.

BRIEF DESCRIPTION OF THE DRAWINGS

FIG. 16 is a diagram showing an example of the servo information area 1302 and the data area 1303, as seen in terms of a preamplifier output, after the magnetic disk medium of FIG. 13 has been formatted.

FIG. 17 is a diagram showing an example of the servo information area 1302 and the data area 1303, as seen in terms of a preamplifier output, after data has been stored in the magnetic disk medium of FIG. 16.

DESCRIPTION OF THE EMBODIMENTS

Figure 1:
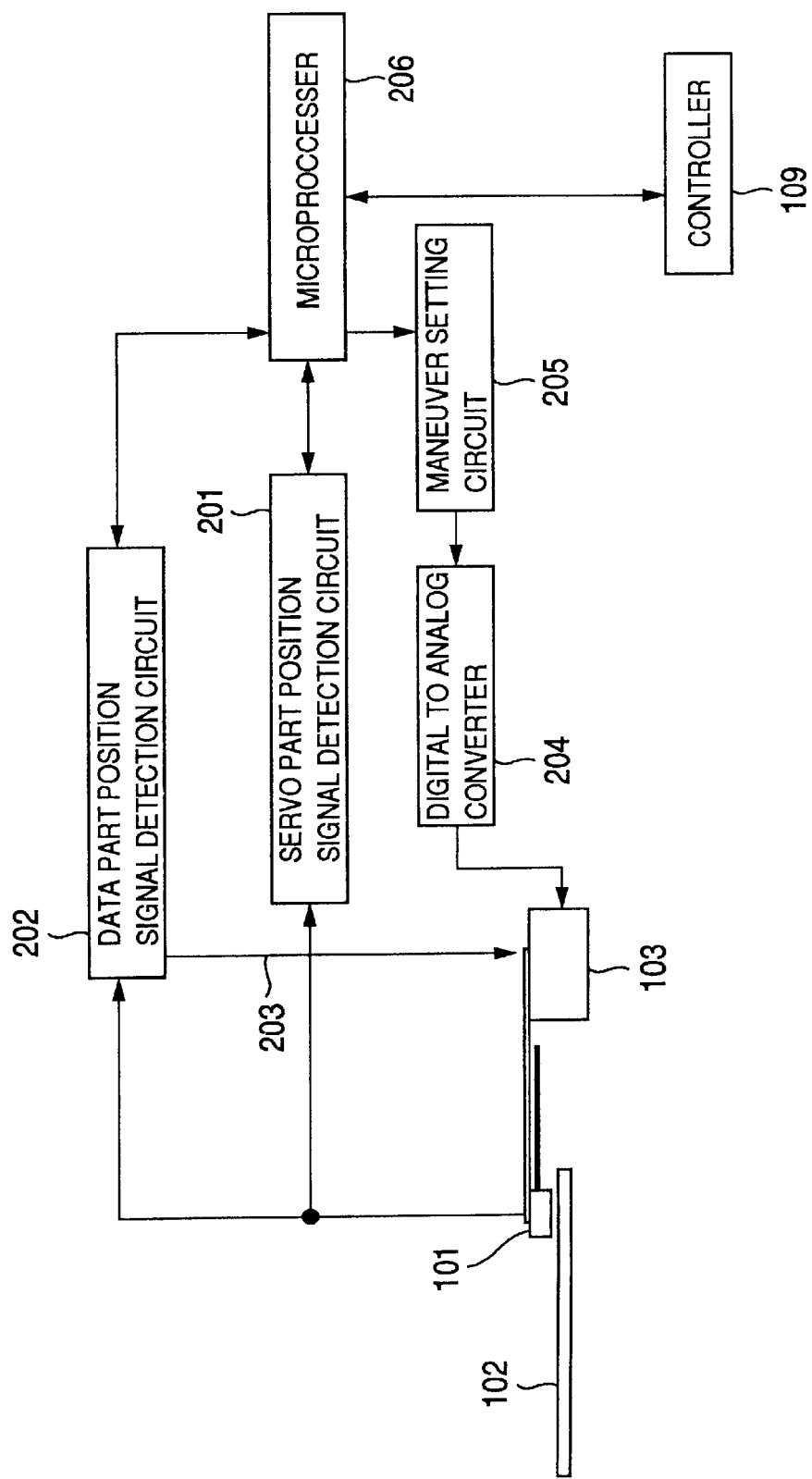
FIG. 1 is a block diagram showing an example of a positioning system in the magnetic disk drive of one embodiment of the invention.

In an example configuration it is assumed that a position signal for positioning the magnetic head can be generated from the data area by using a data signal, i.e., a signal that corresponds to a change in the magnetic domains present in the data area, as if it is a burst signal and by oscillating the magnetic head while reading the data signal. The data signal may be a read signal corresponding to stored data or a read signal corresponding to a prewritten format signal. It should be noted that a word "radial direction" has two meanings, one referring to a direction matching a radius in a strict sense of the word and one referring to a direction along an arc locus described by the magnetic head as it is oscillated by a rotary actuator.

A means for periodically changing the position of the magnetic head in a radial direction at a predetermined frequency or a means for performing a control to position the magnetic head at a target track or predetermined radial position may be a magnetic head-mounting head suspension equipped with a piezoelectric element or other microactuator, or may be a two-stage actuator. The two-stage actuator refers to an actuator having a piezoelectric element or other microactuator in a magnetic head-mounting head suspension. A technology related to the two-stage actuator may be found, for example, in official gazettes of Japanese Patent Unexamined Publication Nos. 2000-298962 and 2000-100097. The two-stage actuator normally has a coarse control mechanism for performing a coarse positioning and a precision control mechanism for performing a precision positioning.

A typical example of the two-stage actuator has a precision control mechanism installed either on a head suspension itself mounted on a conventional rotary actuator or directly on a magnetic head-mounting slider. The precision control is done by using a piezoelectric element, and the magnetic head is finely oscillated by the piezoelectric element which is mounted either on the head suspension or directly on the slider having the magnetic head. The "oscillation of the magnetic head" means finely moving the magnetic head by sending a signal to the precision control mechanism of the two-stage actuator or applying predetermined displacements to it.

Although the periodic oscillation is expected to reduce the output from the magnetic head, leading to a deteriorated bit error rate, it can be compensated for by an error correction which involves setting the amount of oscillation to ⅒ to ¹⁄₂₀ of the track pitch.

To oscillate (minutely move) the magnetic head in the radial direction, an operation called grabbling is performed, which is one of retry operations in the event of an read error. This is an operation to move the magnetic head slightly in the radial direction to remove a projection on the magnetic disk medium when a thermal asperity (TA) phenomenon occurs due to the projection on the magnetic disk medium. This operation and the operation of the present invention are distinguishable technical matters.

One example of this technical matter will be described by referring to embodiments of the present invention.

Figure 2:
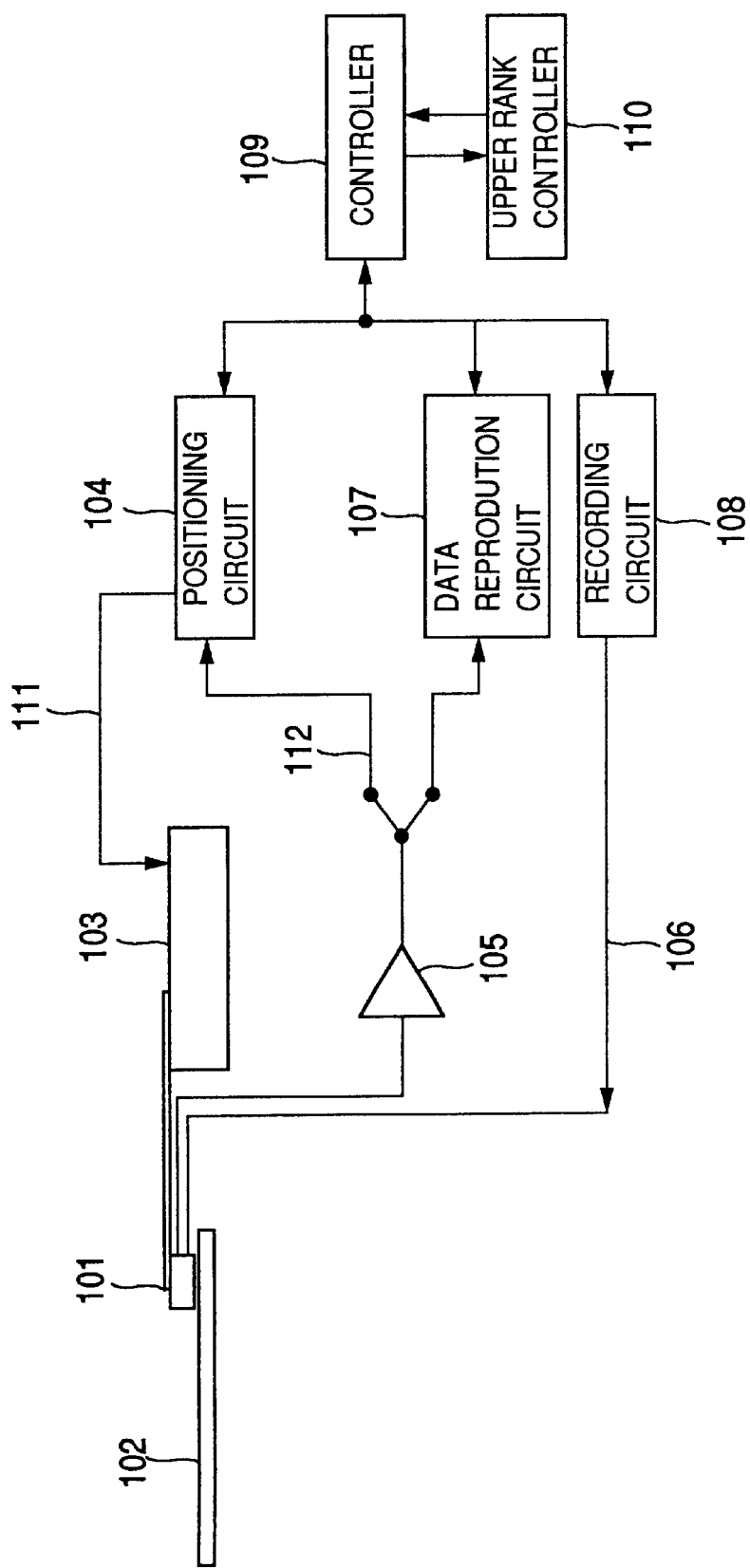
FIG. 2 is a block diagram showing an example configuration of the magnetic disk drive of one embodiment of the invention.
Figure 10:
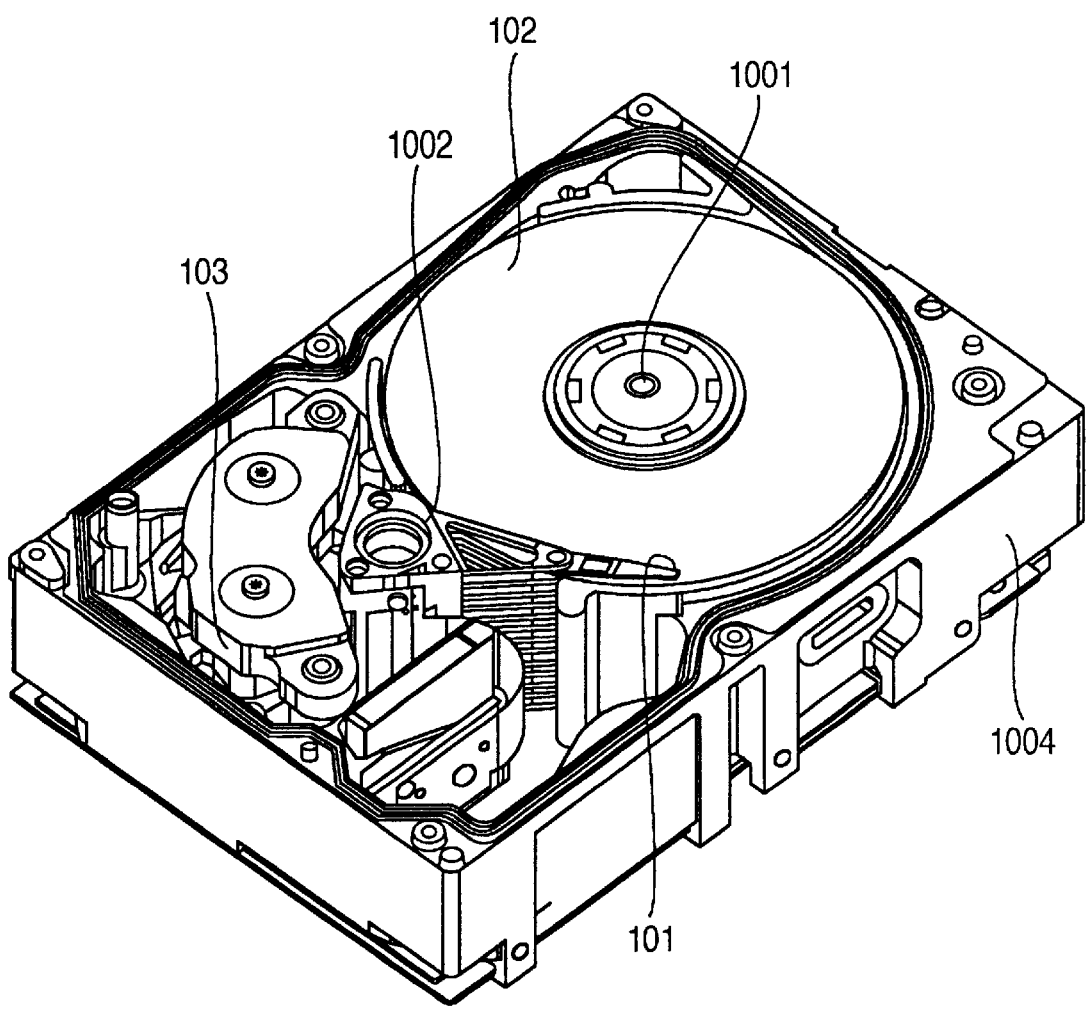
FIG. 10 is an external view of a mechanism portion of the magnetic disk drive as one embodiment of the invention.
Figure 11:
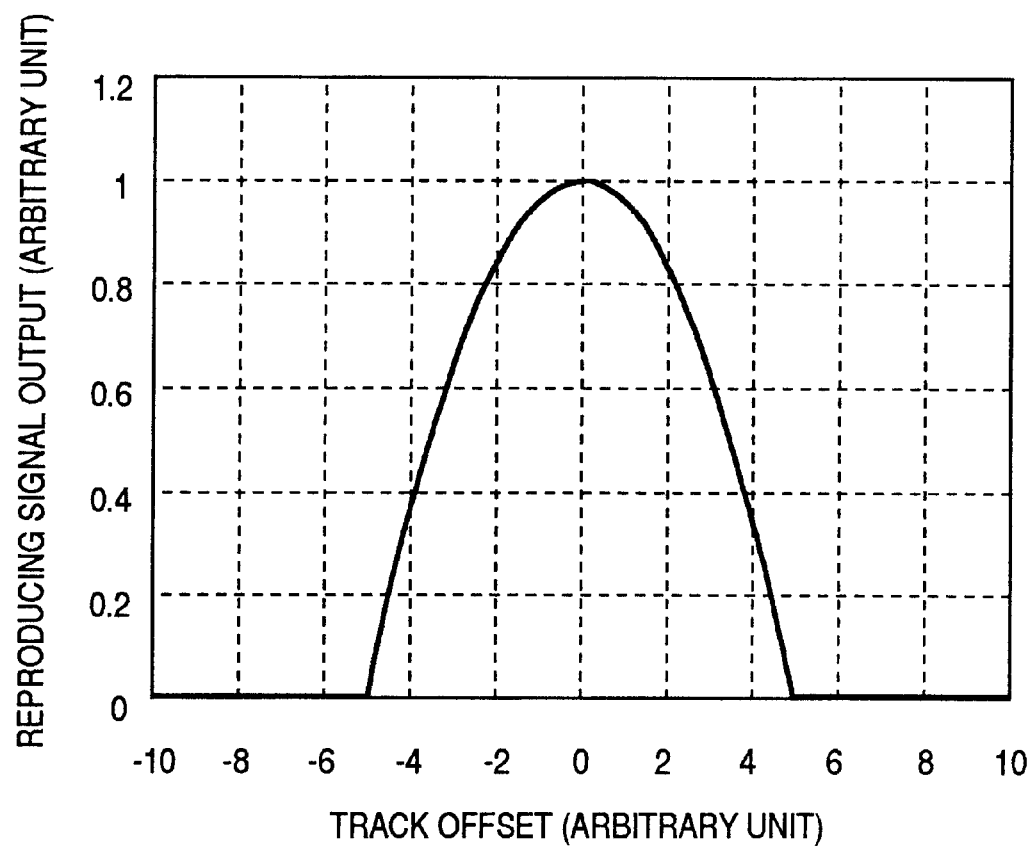
FIG. 11 is a diagram showing a relation between the normal read signal output value and the track offset when the center of the magnetic head deviates from the track center.

FIG. 1 is a block diagram showing an example of a positioning system in the magnetic disk drive applying the invention. FIG. 2 is a block diagram of an entire magnetic disk drive in the case of FIG. 1. FIG. 10 is a perspective view showing an example overall construction of the magnetic disk drive.

Referring to FIGS. 1, 2 and 10, reference number 102 represents a magnetic disk medium, 1001 a spindle motor, 101 a magnetic head, 103 an actuator, 104 a positioning circuit, 105 an amplifier, 106 a write signal, 107 a data read circuit, 108 a write circuit, 109 a controller, 110 an upper rank controller, 111 a position control signal, 112 a read signal, 201 a servo part position signal detection circuit, 202 a data part position signal detection circuit, 203 a signal for periodically oscillating the actuator, 204 a digital-analog converter, 205 a maneuver setting circuit, 206 a microprocessor, 1002 a head arm and magnetic head support mechanism, and 1004 an enclosed housing. FIG. 10 shows the magnetic disk drive with a cover, not shown, removed from one principal plane of the housing 1004 so that the interior can be seen.

The magnetic disk drive for magnetically recording information normally has a plurality of recording surfaces. This invention can be applied where only one recording surface is provided.

Figure 3:
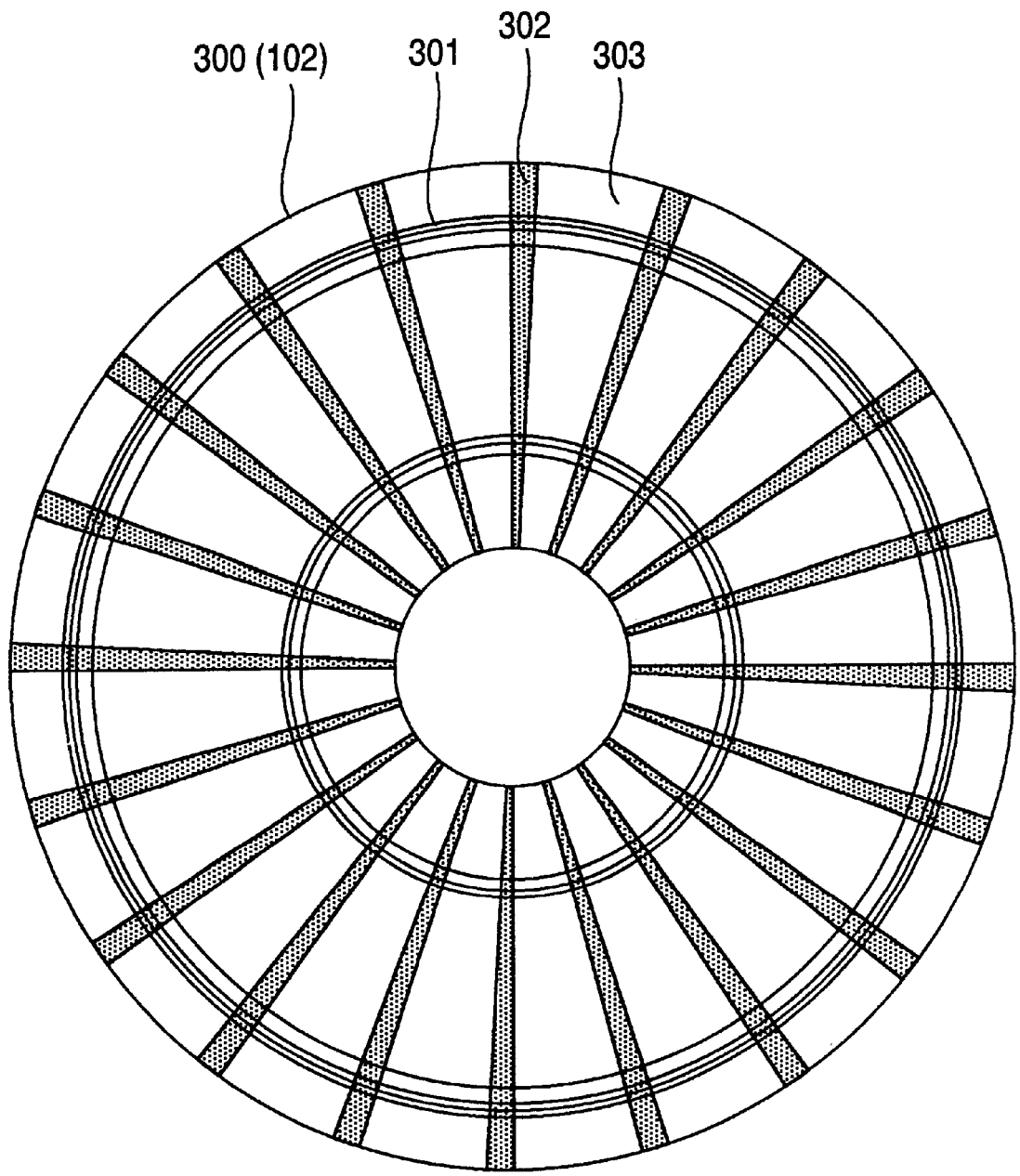
FIG. 3 is a diagram showing servo information areas and data areas in a magnetic disk medium of the magnetic disk drive.

FIG. 3 shows an example arrangement of the servo information areas 302 on the magnetic disk medium 300. On each recording surface servo information used to locate the magnetic head 101 at a desired position is recorded. That is, in an example shown in FIG. 3, a plurality of tracks 301 are arranged concentrically on the recording surface of the magnetic disk medium 300 (102), with each track 301 having alternately arranged in the circumferential direction data areas for recording data and servo information areas 302 for recording magnetic head position information and other management information. The servo information areas 302 each have a track number to identify an individual track and information on a positional deviation from the track center to the magnetic head 101 which is used for making the magnetic head 101 follow the individual track. Denoted 303 is a data area.

The magnetic disk medium 102 is rotated at a constant revolution speed by the spindle motor 1001. The magnetic head 101 disposed opposite the magnetic disk medium 102 detects position information. The position information used to locate the magnetic head 101 at a desired position is read by the magnetic head 101 and fed to the microprocessor 206 through the servo part position signal detection circuit 201 and the data part position signal detection circuit 202. That is, a target position specified by the controller 109 and a position signal from the position signal detection circuits 201, 202 are sent to the microprocessor 206.

Based on the target position from the controller 109 and the position signal from the position signal detection circuits 201, 202, the microprocessor 206 performs calculations for the control system for positioning the magnetic head 101, and converts an amount of maneuver into an analog signal by the digital-analog converter 204 through the maneuver setting circuit 205. Designated 203 is a signal for periodically oscillating the actuator.

Next, the analog signal is sent to an actuator drive circuit 405, not shown, to drive the actuator 103. The actuator 103 positions the magnetic head 101 at the specified target position on the magnetic disk medium 102 by the magnetic head support mechanism 1002.

Figure 4:
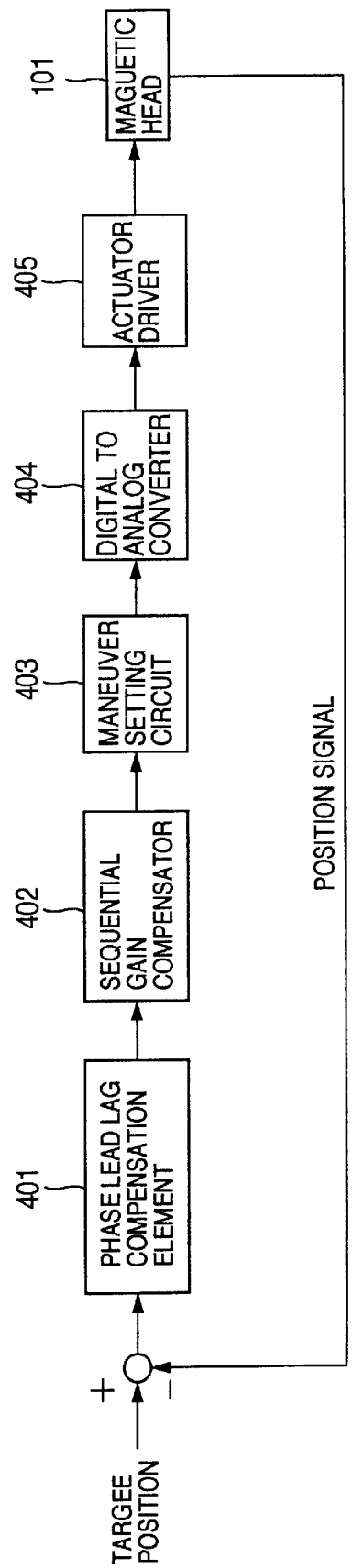
FIG. 4 is a block diagram showing a configuration of a track-following control system in the magnetic disk drive of one embodiment of the invention.

The microprocessor 206 of the magnetic disk drive controls the magnetic head 101 by the track-following control function so that the magnetic head 101 follows the track 301 shown in FIG. 3. As shown in FIG. 4, the track-following control comprises a phase lead/lag compensation element 401, a sequential gain compensator 402 and other control elements and controls the position of the magnetic head so that a position error signal generated from a signal corresponding to the target position and a position signal detected by the magnetic head 101 becomes zero. Denoted 403 is a maneuver setting circuit, 404 a digital-analog converter, and 405 an actuator driver.

Figure 5:
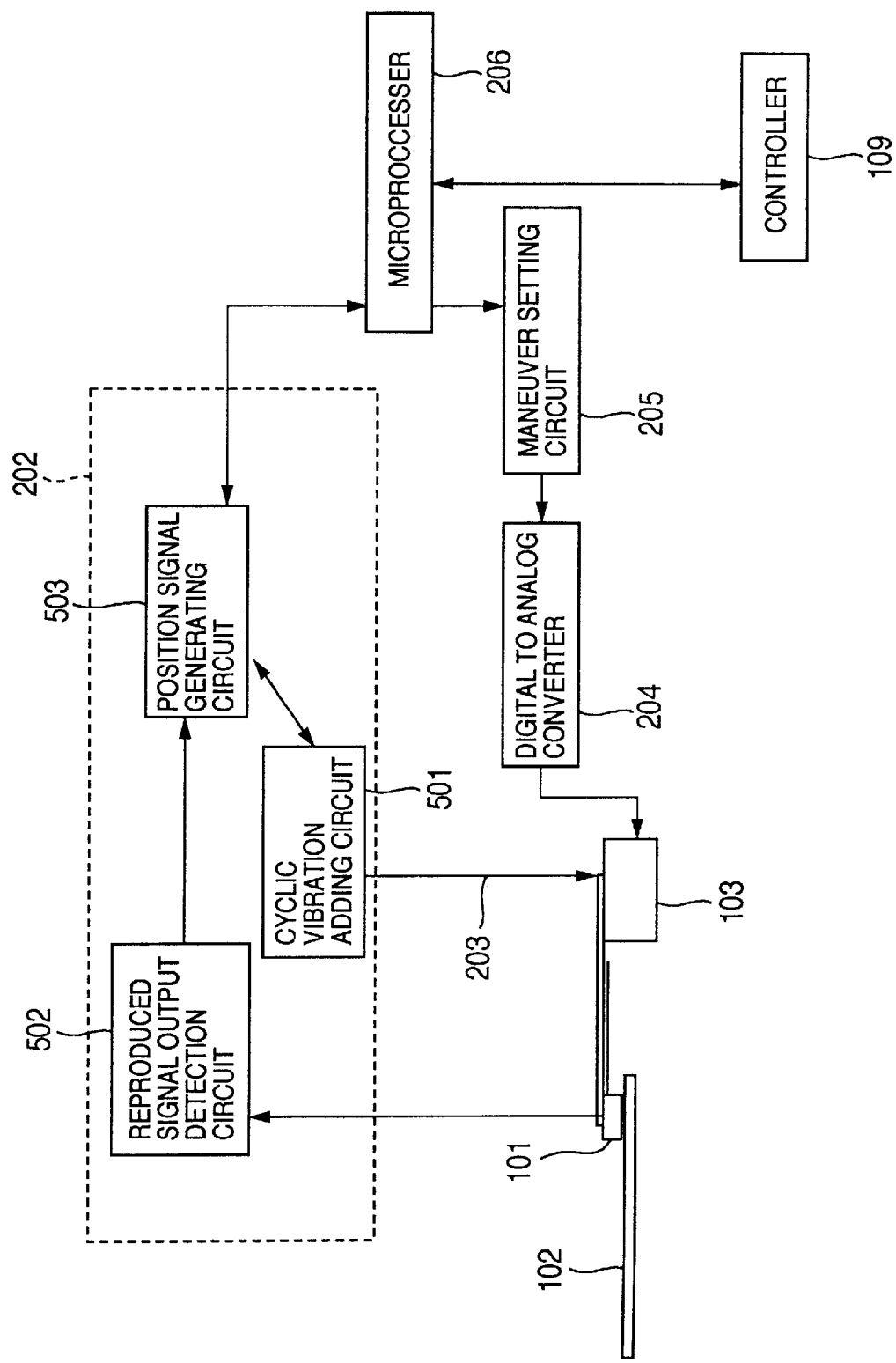
FIG. 5 is a diagram showing an example circuit in the magnetic disk drive of one embodiment of the invention for generating a position signal from a data part.

As shown in FIG. 5, a circuit 501 is a cyclic oscillation adding circuit that applies a periodic voltage to a voice coil motor at a predetermined frequency, 203 a signal for periodically oscillating the actuator, 204 a digital-analog converter, 205 a maneuver setting circuit, and 206 microprocessor. A circuit 502 is a read signal output detection circuit which detects at an appropriate time constant an amplitude of the read signal while the magnetic head is reading the data area. A circuit 503 is a position signal generating circuit that generates a position signal from the amplitude of a predetermined point in time.

In this embodiment the position information can be obtained from the read signal of the data area in the following manner.

Normally, the read signal waveform of the data area is a random signal with no regularity. However, when the magnetic head 101 is at the center of the data track, if the amplitude of the read signal waveform from the data area is averaged over a sufficiently long period of time before being output, the output becomes constant. The sufficiently long period of time for the data normally refers to a length of time corresponding to several tens of bytes of data. One example is shown below.

| Revolution per minute (RPM) | Number of servos (per cycle) | Servo interval (microsecond) | Number of data sectors |
|---|---|---|---|
| 10025 | 80 | 74 | 662 |

| Transfer speed (Mbits/second) | Recording density (kbpi) | Time for one bit | Amplitude measuring time (sufficiently long) |
|---|---|---|---|
| 629 | 366 | 1.6 nanoseconds | 1.7 microseconds (64 Bytes) |

When there are a plurality of sectors in a data area, a burst signal of several tens of bytes (identical to 1–2 microseconds) is provided in advance between a sector and the servo information area or between these sectors and the magnetic head is oscillated between these sectors. This makes it possible to output an amplitude value of the read signal waveform averaged over a sufficiently long period of time. The burst signal may be recorded during a formatting process performed at the initial stage of manufacture of the magnetic disk drive. While in the configuration of FIG. 5 a periodic voltage signal is applied to the voice coil motor, if a two-stage actuator is used as the actuator, a periodic electric signal is applied to an element that makes up the precision control mechanism. Now, let us return to FIG. 5.

While the data area is read, a periodic voltage signal is applied to, for example, the two-stage actuator to change the position of the magnetic head cyclically, i.e., oscillate the head.

Figure 6:
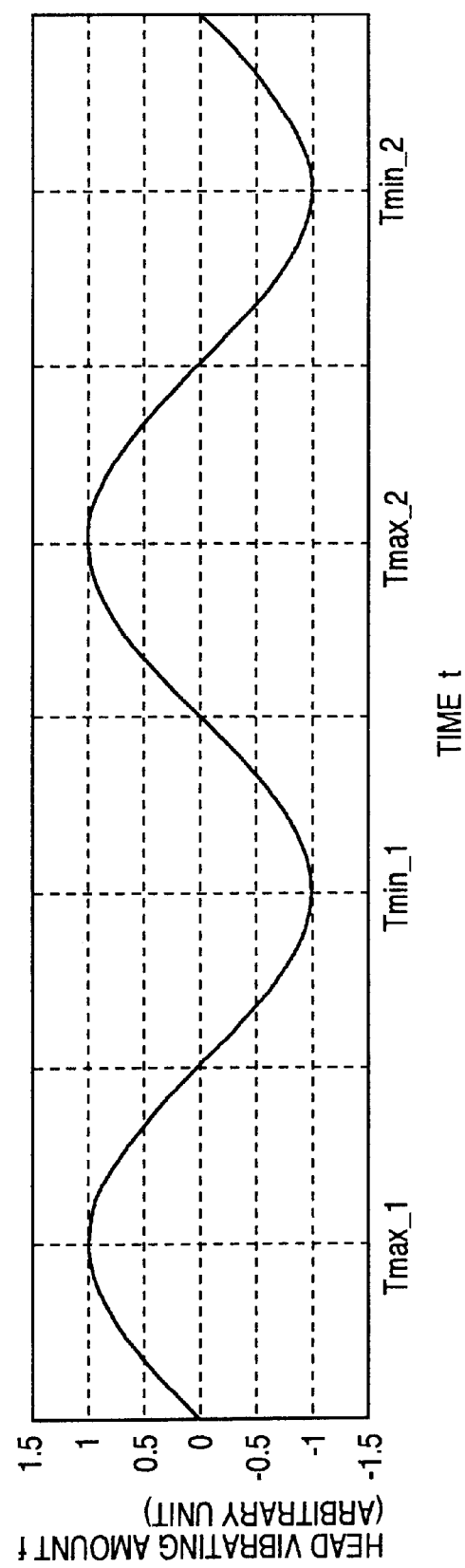
FIG. 6 is a graph showing a head periodic oscillation and an example change in a read signal output value from the head in the magnetic disk drive of one embodiment of the invention.

The signal waveform representing the displacement of the magnetic head when the actuator 103 is applied with periodic vibrations is shown in FIG. 6. As to the direction of movement of the magnetic head, a direction of movement toward the inner circumferential side on the magnetic disk medium is taken as a positive direction and the direction of movement toward the outer circumferential side is taken as a negative direction. Of points in time at which the oscillation of the magnetic head is largest in the positive direction, an i-th point in time is taken as $Tmax\_i$. Of points in time when the oscillation of the magnetic head is largest in the negative direction, an i-th point in time is taken as $Tmin\_i$. The maximum value refers to a largest magnitude by which the magnetic head deviates toward the inner circumferential direction on the magnetic disk medium 102. A minimum value refers to a largest magnitude by which the magnetic head deviates toward the outer circumferential direction.

The magnitude of oscillation is about $1/10$ to $1/20$ of the track pitch. The time during which a frequency is applied is several hundred bytes to several kilobytes long with respect to the length of data and the frequency is several tens of kHz.

The lower limit of the oscillation frequency needs to be larger than the normally used frequency at which to read the servo information and thus around 10 kHz. With this invention, if the amount of servo information provided on the disk medium is reduced, a signal that takes the place of the servo information can be obtained from the data area. Hence, the oscillation frequency can be reduced below 10 kHz depending on the number of servo information areas. However, setting the lower limit requires avoiding the undesired natural frequency of the head suspension itself.

The upper limit of the oscillation frequency on the other hand is determined by the following factors. The interior of the magnetic disk drive is normally filled with air and the viscosity of air between the magnetic disk medium and the slider mounting the magnetic head may cause pitching vibrations which are not desirable to the drive. The oscillation frequency of the pitching vibrations is 200 kHz to 300 kHz and must be avoided. Further, the characteristics of the element of the two-stage actuator that performs the precision control and the inertial mass and others of the magnetic head-mounting slider combine to determine the upper limit of the oscillation frequency, at around 500 kHz. If the pitching vibrations are to be avoided at the lower frequency side, the upper limit may be set at around 150 kHz.

Let the amplitude of a read signal at some point in time t be V(t). To avoid being influenced by the recorded data pattern, the amplitude V(t) of the read signal uses an envelope of a data string having at least several tens of bytes. In synchronism with minute oscillations of the magnetic head, the value of the envelope is picked up to form a signal waveform representing the displacement of the magnetic head.

In this invention, a position signal representing the radial position of the magnetic head at time t uses P(t) given by equation (1).

$$P(T\_i)=V(Tmax\_i)-V(Tmin\_i) \quad \text{(Equation 1)}$$

Figure 7:
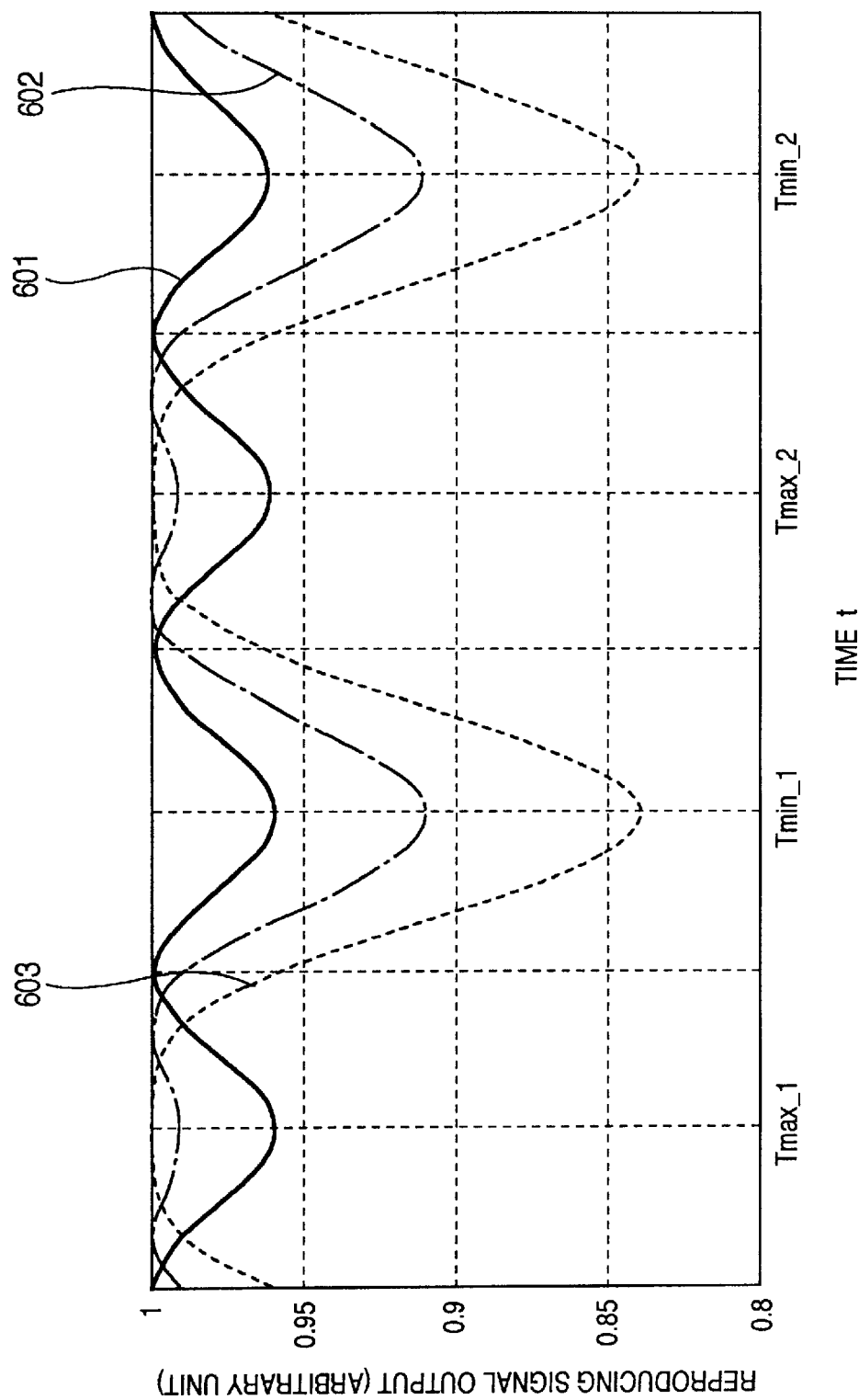
FIG. 7 is a graph showing a change in the read signal output value of FIG. 6 and examples of read signal output values 602, 603 when the magnetic head deviates to an outer circumferential side of the magnetic disk medium.
Figure 8:
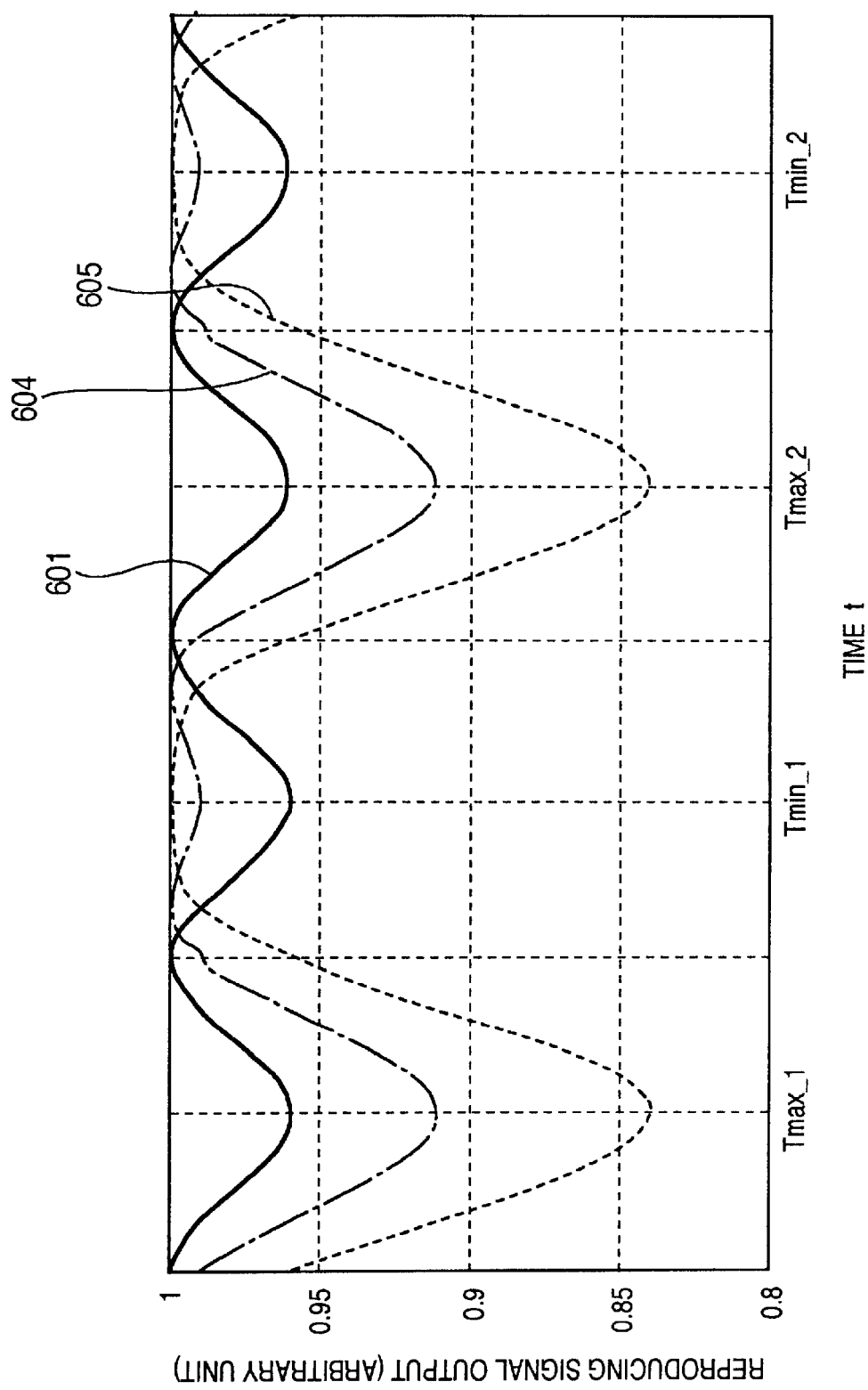
FIG. 8 is a graph showing a change in the read signal output value of FIG. 6 and examples of read signal output values 604, 605 when the magnetic head deviates to an inner circumferential side of the magnetic disk medium.

In the data area where the magnetic head is situated, when the track offset of near DC component is 0, P(t) is 0. When the track offset indicates the magnetic head deviating toward the outer circumferential side or inner circumferential side, the position signals P(t) assume values of opposite signs having magnitudes depending on the amount of offset, as shown in FIG. 7 and FIG. 8. These values are observed in synchronism with the time Tmax_i when the cyclic oscillation is maximum and with the time Tmin_i when it is minimum.

Hence, observing the track offset can perform the position control.

Figure 9:
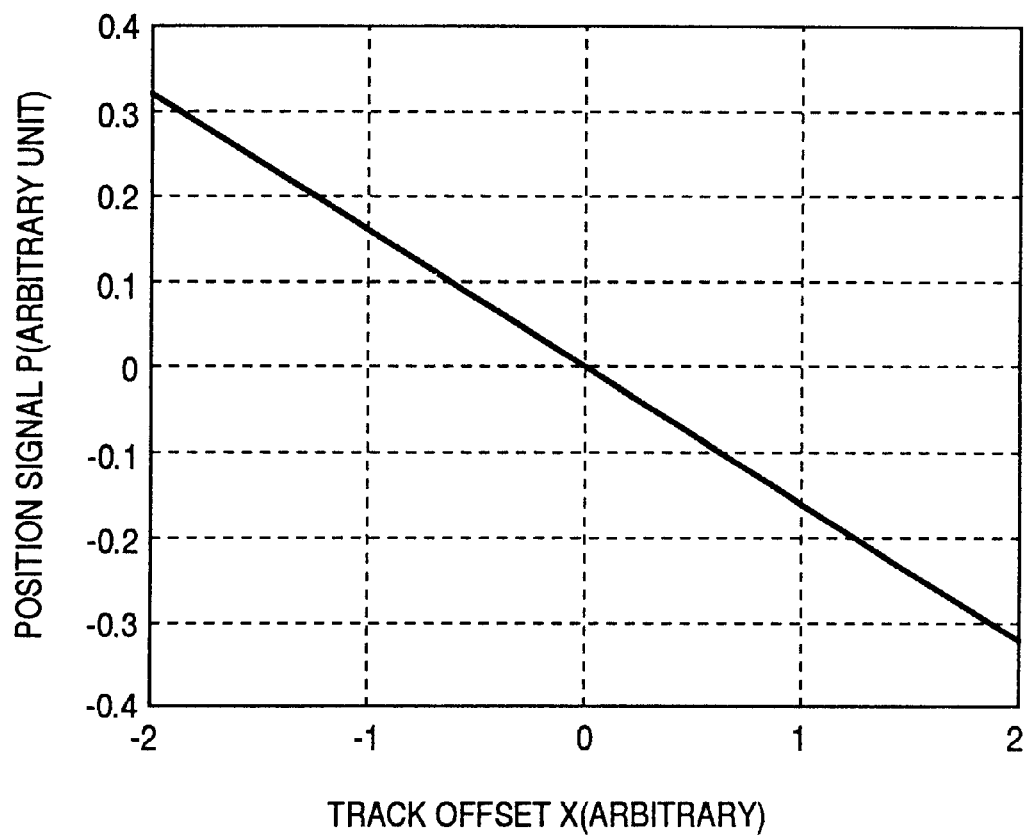
FIG. 9 is a diagram showing that a relation between the track offset and the position signal output value is linear when the center of the magnetic head deviates from the center of the data track in the magnetic disk drive as an example of application of the invention.

That is, the position signal P(t) expressed by the equation (1) is linear with respect to the deviation of the center of the magnetic head from the center of the data track, as shown in FIG. 9, and thus can be used as the position signal. By determining an appropriate control parameter in advance, the position control can be performed using this position signal P(t).

The above operation may be assigned to the position signal generation circuit or the microprocessor 206. Designated 601 is a read signal output value when the average position of the magnetic head is at the center of the track; 602 a read signal output value when the average position of the magnetic head is offset in the negative direction; and 603 a read signal output value when the average position of the magnetic head is largely offset in the negative direction.

FIG. 6 shows the output of the magnetic head as the center of the magnetic head is displaced from the center of the track. The signal output can be picked up by one of the following methods.

(1) On a printed circuit board formed with electronic circuits of the magnetic disk drive, the signal is detected by a measuring means such as oscilloscope from a terminal that outputs a position error information signal.

(2) An output of a preamplifier that amplifies the signal from the magnetic head or an output signal of the AGC of the read/write channel IC is detected by an oscilloscope or the like. The servo burst waveform is observed, and its change over time or a position converted from the time-dependent change is output.

Figure 12:
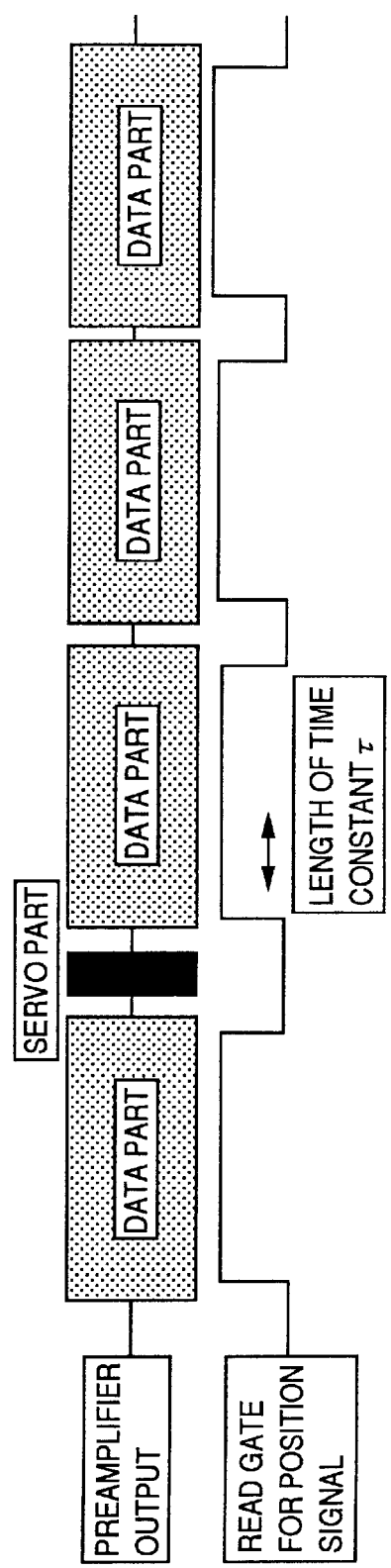
FIG. 12 is a diagram showing how signal processing is performed by opening a read gate for a predetermined time constant to read from the data area on the magnetic disk medium.

The signals of FIG. 7 and FIG. 8 are obtained as follows. A preamplifier output of FIG. 12 is read into the read signal output detection circuit 502 of FIG. 5A by opening a read gate at a timing shown at the bottom of FIG. 12. In the servo information area of FIG. 12, the information is not input. In the data area the read gate is opened for a time duration corresponding to a predetermined time constant to input the data signal. More specifically, the following processing or computation is performed while the read gate is open.

When the preamplifier output is an analog signal, it is introduced to a full wave rectifying circuit and integrated by an integration circuit over a predetermined time constant τ to produce an output of the read signal output detection circuit 502.

When the preamplifier output is a digital signal, it is introduced to a read channel IC or microprocessor which calculates an average amplitude for the duration of τ to produce an output of the read signal output detection circuit 502. At this time, it is also possible to measure the number of errors that occur during the time τ.

Denoted 604 is a read signal output value when the average position of the magnetic head is offset in the positive direction; and 605 is a read signal output value when the average position of the magnetic head is largely offset in the positive direction. In a magnetic disk drive using a composite magnetic head that uses a magnetoresistive element (MR element) as a read head and writes data by an inductive head, the write magnetic field of the inductive head during the writing of data affects the MR element of the read head, so that function of the read head is normally turned off during the writing operation. That is, when the write gate is open to write data on the magnetic disk medium, the read gate is closed and no signal is picked up from the read head. Conversely, when the read gate is open, the write gate is closed. The write gate and the read gate are normally opened or closed alternately in this manner but, when viewed macroscopically, they perform read and write operations parallelly on the magnetic disk medium.

In FIGS. 6 to 8, the read signal is detected in synchronism with the oscillation of the magnetic head in the radial direction. This oscillation is applied by the cyclic oscillation adding circuit 501 and information on the timing at which to apply oscillation is entered into the position signal generating circuit 503. This processing is done for the control system of FIG. 5 to determine where on the magnetic disk medium the magnetic head is situated at a time when the signal is obtained by processing the preamplifier output of FIG. 12. As a result, as shown in FIG. 7 or FIG. 8, it becomes clear in which direction, positive or negative direction, the magnetic head is deviated from the center of the track.

Rather than synchronizing the read signal detection with the head oscillation in the radial direction, it is possible to measure a position error of the magnetic head in the radial direction and the read signal amplitude or error rate corresponding to the position error almost at the same time for a duration sufficiently short compared with the oscillation period.

The minute oscillation for the magnetic head need only be applied when, after the seek operation by the magnetic head moving from one track to another has been finished, the magnetic head begins the track-following operation to follow the target track. That is, one possible long-term timing at which to apply the minute oscillation to the magnetic head is during the track-following operation.

When the magnetic head has a plurality of moving parts, as in a suspension with an actuator, the minute oscillation can always be applied by the suspension with an actuator.

When data is read from the data area, the signal from a target sector can be processed more easily by turning off the minute oscillation. To prevent the track-following characteristics from deteriorating, the magnetic head's minute oscillation component of the read signal from the data area can be canceled by the signal processing circuit or signal processing function because the waveform of the minute oscillation is already known in the control circuit.

The center of the magnetic head need only be the center of an electric signal as seen from the magnetic disk drive and does not necessarily mean the physical center nor the magnetically effective center of the magnetic head. The center of a data track also need only be the center of a data track as determined by the magnetic disk drive.

Although in this embodiment the application of a cyclic signal and the correction of position are done by applying a voltage to the actuator 103, the same can also be achieved by other means. For example, the suspension or slider element of the magnetic head 101 may be mounted with a piezoelectric element which is then applied with a voltage to produce periodic oscillations or to control the position of the magnetic head.

Further, while in this embodiment the position signal is generated by using the output value of the read signal waveform, any quantity that depends on the offset from the track center can be used for generating the position signal. Examples of such quantities include a bit error rate per unit of time, the number of errors, and a sample amplitude margin. The sample amplitude margin is described in a literature "IEEE Transaction on Magnetics Vol. 31 P.1109–1114 A Window-Margin-Like Procedure for Evaluating PRML Channel Performance."

In the above embodiment, it is assumed that the target value of the position control is zero. The target value can be set at an arbitrary value to offset the magnetic head from the center of the data center.

For example, by differentiating the target values for the writing and reading operations to eliminate a radial position deviation between the write head and the read head, the magnetic head 101 can be positioned at appropriate positions for the writing and reading operations.

Figure 13:
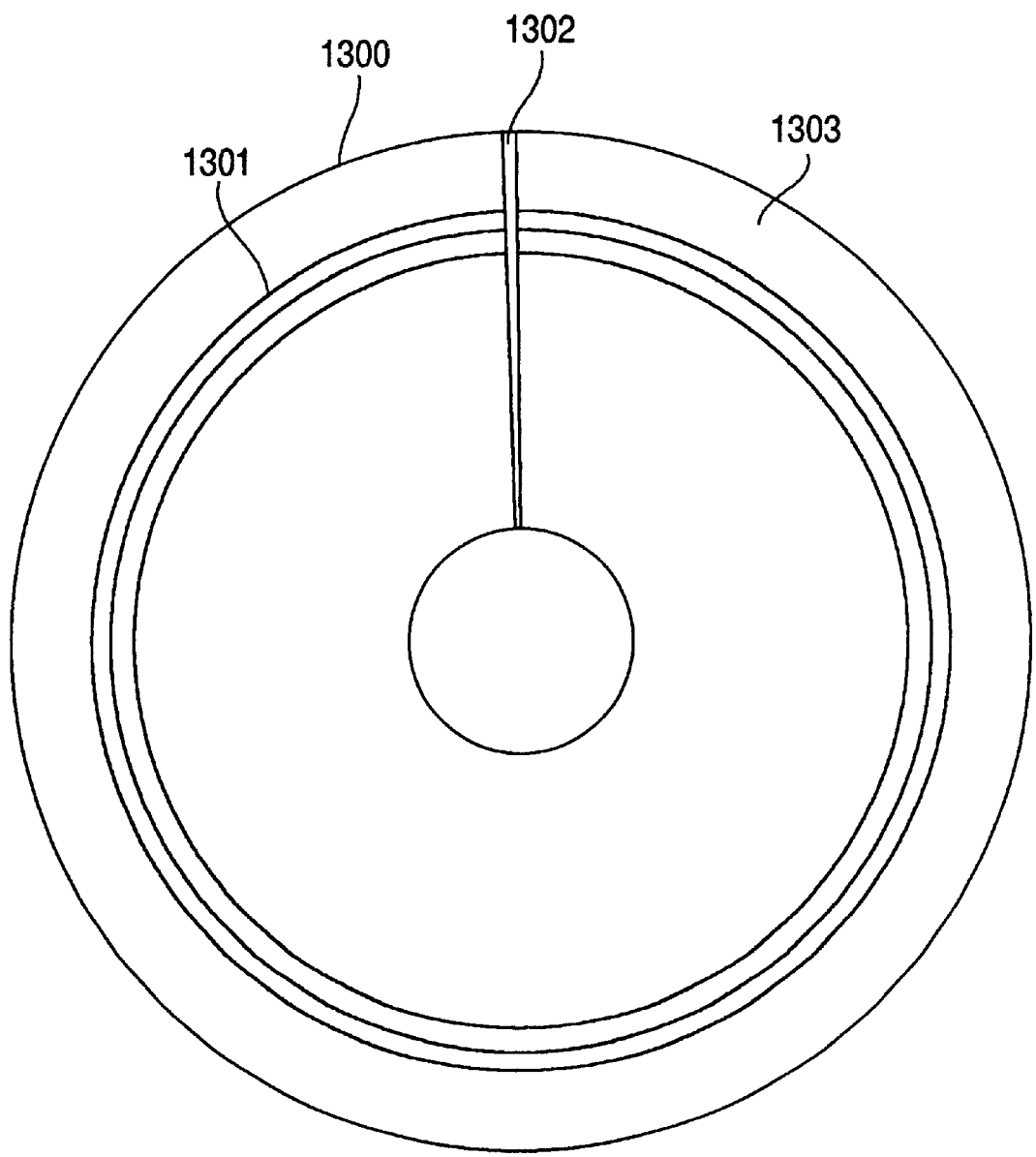
FIG. 13 is a diagram showing how a magnetic disk medium is formatted in one embodiment of the invention.
Figure 14:
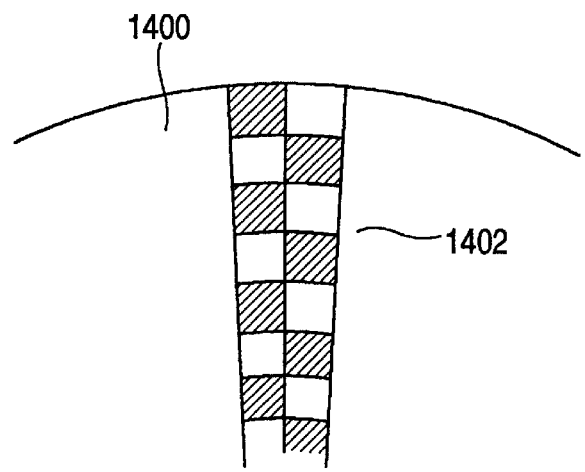
FIG. 14 is a diagram showing a detailed example of the servo information area 1302 in the magnetic disk medium of FIG. 13.
Figure 15:
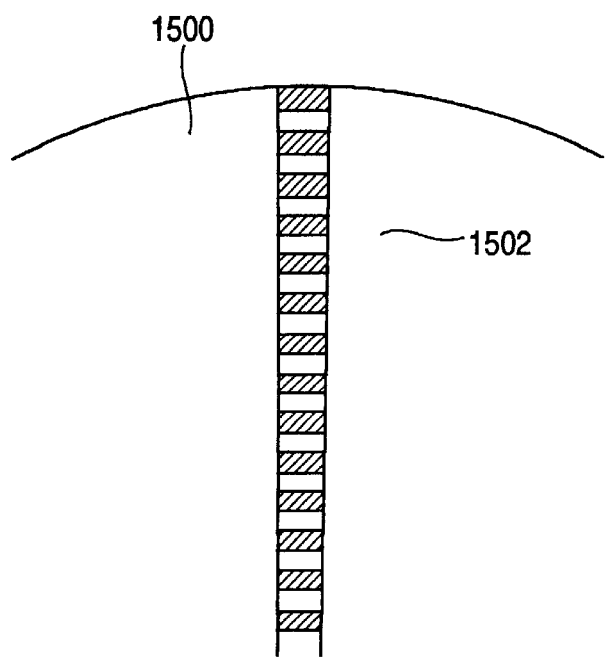
FIG. 15 is a diagram showing another detailed example of the servo information area 1302 in the magnetic disk medium of FIG. 13.

FIG. 13 shows a schematic diagram of the magnetic disk medium 1300 used in another embodiment of the invention. A servo information area 1302 is provided in one area along one radius of the magnetic disk medium 1300. This servo information area is provided by using a servo track writer or other medium formatting device. As for the detailed configuration, the servo information area 1302 may be one 1402 with a checkerboard pattern or one 1502 with a stripe pattern, extending from the innermost circumference to the outermost circumference of the magnetic disk medium 1400 (FIG. 14) or 1500 (FIG. 15). The advantage of using a single servo signal is that even if the outer edge of the magnetic disk medium 1300 and the circumferential tracks are not perfectly concentric and there is some eccentricity between them, the magnetic head returns on the original servo signal after one rotation.

After the magnetic disk medium 1300 is incorporated into the magnetic disk drive, the magnetic head in the magnetic disk drive picks up a servo signal from the servo information area 1302. According to the position of the checkered pattern of FIG. 14 and the stripe pattern of FIG. 15, the following formatting operation is performed in the circumferential direction 1301 of the medium 1300. For example, a format signal such as "FFFF" in a hexadecimal notation is stored in an in-plane direction or vertical direction of the magnetic disk medium 1300 as magnetic domain reversals of "10101010 . . ." without scrambling. The "FFFF" signal is a simple example and this formatting is useful for the subsequent signal processing such as PRML. What kind of signal is used in formatting varies from one magnetic disk manufacturer to another. The surface of the medium in the magnetic disk drive immediately after shipping therefore stores magnetization reversals "101010 . . ."

Between the formatting signal and the actual signal sent to the magnetic head, processing such as scrambling or coding is normally performed.

The magnetic disk medium 1300 formatted in this manner is recorded with a servo information area 1302 along one radius, and the remaining data area 1303 is formatted with "FFFF" so that a burst signal can be read accordingly. Further, the fact that the servo information area 1302 exists at only one location in each magnetic disk medium 1300 contributes to high density storage of data. The servo information area 1302 may be provided at two or more locations as long as they do not adversely affect the high density recording.

FIG. 16 shows the preamplifier output after the magnetic disk medium 1300 has been formatted as described above. The output comprises burst signals 1604 read from the magnetic domain reversals representing the format signals and a servo signal 1602 read from the servo information area. In this state, the write operation is performed according to the instructions from a higher rank device to store information in the data part 1603 of the data area. Then the sector arrangement will be as shown in FIG. 17. FIG. 16 shows a preamplifier output signal picked up by the magnetic head flying over the magnetic disk medium that was formatted with one servo information area taken as a reference. When the formatting is done by the magnetic head of the magnetic disk drive, the burst signal 1604 gives the magnetic disk medium the magnetic domain reversals of a width almost equal to that of the track which forms sectors 1705 of FIG. 17.

In FIG. 17, the servo signal 1702 in the servo part is provided along one radius of the magnetic disk medium 1300 or a plurality of radii, the number of which should not be so large as to degrade the occupancy rate of the data area on the medium. There are a plurality of sectors 1705 in the data area 1703. Because there are variations in the accuracy with which the magnetic head is positioned during the information writing operation, the data storage positions in these sectors are not necessarily aligned. In such a case, the position signal for the magnetic head needs to be generated by using burst signals 1704 corresponding to the format signals which remain in gaps between data parts, in servo information areas, or between the data part adjacent to the servo information area and the servo information area.

The position signal read gate signal in FIG. 17 opens or closes the gate at a timing 1706, such as a gap between the sectors. While the gate is open, a position signal is generated for a predetermined duration of time constant $\tau'$ 1707 from the burst signals 1704 representing the magnetic domain reversals on the medium that was formatted in advance. That is, the magnetic head is oscillated at the timing of $\tau'$ 1707 to read the corresponding burst signal and process the signal to generate a position signal for the magnetic head. In this embodiment, even if the positions of recorded data sectors are not aligned, accurate position signals for the magnetic head can be generated.

As described earlier with reference to FIG. 12, the read gate and the write gate are normally not "open" at the same time. This is because the write magnetic field produced at time of writing crosses the MR read head, generating undesired signals. When the read gate is open, the write gate is closed. For example, when the magnetic disk drive is performing the write operation, the write gate is opened to record information on the magnetic disk medium. To ensure that the magnetic head follows a desired track accurately, the write gate is closed at predetermined intervals to open the read gate instead and thereby read the servo signal or a signal of this invention replacing the servo signal. The relation between the read gate signal and the write gate signal shown at the bottom of FIG. 17 include such a case.

Although the magnetic head may be allowed to continue oscillating in the data area to pick up a signal at a predetermined timing, the fact should be taken into consideration that a predetermined time is spent performing the error correction by CRC because the allowable displacement of the magnetic head from the sectors 1705 in reading the data correctly is 1/10 to 1/20 of the track pitch.

In writing data, it is common practice to close the read gate because the write magnetic field adversely affects the read magnetic head making it impossible to read a signal correctly. If the magnetic disk drive or the magnetic head is so constructed as to avoid being subjected to such influences, the data can be written and read while the magnetic head is being oscillated.

In a drive that requires a servo signal for the seek operation of the magnetic head, a predetermined number of servo information areas are recorded on the magnetic disk medium. When a longer seek time caused by fewer servo signals is permitted, it is possible to use a smaller number of servo information areas than that used in the ordinary magnetic disk drive.

In a magnetic disk drive that uses a magnetic disk medium without a single servo information area such as that shown in FIG. 13, because a servo signal cannot be generated from the conventional servo information area, the signal generated from the data area by applying this invention is used as a servo signal replacement signal for the seek operation. For example, when a track that stores magnetic domain reversals corresponding to a predetermined format signal exists on the magnetic disk medium, the application of this invention can generate the servo signal replacement signal which in turn enables the track-following operation and seek operation.

With this invention, the control of magnetic head position can be done even in the data area, making a substantial contribution to an improved performance of the magnetic disk drive.

When the present invention is combined with a conventional technique of generating a servo signal from the servo information area, the number of servo information areas can be reduced, contributing to a higher density recording in the magnetic disk drive as a whole.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk drive comprising:
  a magnetic disk medium rotatably supported to store information;
  a magnetic head to write information to or read information from the magnetic disk medium;
  an actuator to support the magnetic head so that the magnetic head can be moved in a radial direction of the magnetic disk medium; and
  a function to oscillate the magnetic head in the radial direction in a data area of the magnetic disk medium to read the information.

2. A magnetic disk drive comprising:
  a magnetic disk medium rotatably supported to store information;
  a magnetic head to write information to or read information from the magnetic disk medium;
  an actuator to support the magnetic head so that the magnetic head can be moved in a radial direction of the magnetic disk medium;
  a first function to oscillate the magnetic head in the radial direction in a data area of the magnetic disk medium; and
  a second function to process a read signal from the magnetic head during the execution of the first function.

3. A magnetic disk drive comprising:
  a magnetic disk medium rotatably supported to store information;
  a magnetic head to write information to or read information from the magnetic disk medium;
  an actuator to support the magnetic head so that the magnetic head can be moved in a radial direction of the magnetic disk medium;
  a first function to oscillate the magnetic head in the radial direction in a data area of the magnetic disk medium;
  a second function to process a read signal from the magnetic head during the execution of the first function; and
  a control circuit having a third function, the third function controlling a position of the magnetic head according to the signal processed by the second function.

4. The magnetic disk drive according to claim 2 or claim 3, wherein the first function is realized by a precision control mechanism of a two-stage actuator.

5. The magnetic disk drive according to claim 4, wherein the first function is realized by a control circuit which outputs a periodic signal to the precision control mechanism of a two-stage actuator.

6. A control method of a magnetic head comprising a magnetic disk medium rotatably supported to store information; a magnetic head to write information to or read information from the magnetic disk medium; an actuator to support the magnetic head so that the magnetic head can be moved in a radial direction of the magnetic disk medium; and a control circuit to control these, the control method comprising:
  a first step of moving the magnetic head; and
  a second step of oscillating the magnetic head in a data area of the magnetic disk medium.

7. The control method according to claim 6, wherein an oscillation frequency of the second step is between 10 kHz and 500 kHz.

8. The control method according to claim 6, wherein the second step generates a position signal for the magnetic head from the data area of the magnetic disk medium.

9. The control method according to claim 6, further comprising:
  a third step of reducing an amplitude of a signal waveform representing the oscillation, the signal waveform being produced based on the read signal from the magnetic head.

10. The control method according to claim 6, further comprising:

a third step of stopping the oscillation of the magnetic head in a predetermined data area.

11. A magnetic disk drive comprising:
a rotatably supported magnetic disk medium having servo information for positioning a magnetic head and a data area for storing data representing user information;
a magnetic head to write information to or read information from the magnetic disk medium;
an actuator to support the magnetic head so that the magnetic head can be moved onto the magnetic disk medium; and
a function to oscillate the magnetic head in the data area of the magnetic disk medium.

12. The magnetic disk drive according to claim 11, wherein an oscillation frequency of the magnetic head is between 10 kHz and 500 kHz.

13. The magnetic disk drive according to claim 11, wherein the magnetic head oscillating function generates a position signal for the magnetic head from the data area of the magnetic disk medium.

14. The magnetic disk drive according to claim 11, wherein the magnetic head oscillating function is realized by a space on the magnetic disk medium between sectors of the data area.

15. The magnetic disk drive according to claim 11, wherein a direction of oscillation of the magnetic head is a radial direction of the magnetic disk medium.

16. A magnetic disk drive comprising:
a rotatably supported magnetic disk medium;
a magnetic head to write information to or read information from the magnetic disk medium;
a signal detection circuit to detect a read signal from the magnetic head;
an actuator to position the magnetic head at an arbitrary position on the magnetic disk medium;
an oscillation adding circuit to produce a signal for applying oscillations to a mechanism of the actuator;
a position signal generation circuit to generate a position signal from outputs of the signal detection circuit and the oscillation adding circuit;
a maneuver setting circuit to set a value for operating the actuator;
a D/A converter circuit to convert a digital signal from the maneuver setting circuit into an analog signal; and
a microprocessor connected to the position signal generation circuit and the maneuver setting circuit.

17. The magnetic disk drive according to claim 16, wherein when the magnetic head is in a data area, the oscillation adding circuit generates its signal and the position signal generation circuit produces its output to control the position of the magnetic head.

18. A control method of a magnetic disk drive, wherein the magnetic disk drive includes a rotatably supported magnetic disk medium having servo information for positioning a magnetic head and a data area for storing data representing user information, a magnetic head to write information to or read information from the magnetic disk medium, and an actuator to support the magnetic head so that the magnetic head can be moved onto the magnetic disk medium; the control method comprising:
a first step of positioning the magnetic head at an arbitrary track on the magnetic disk medium;
a second step of closing a write gate in the data area on the magnetic disk medium; and
a third step of generating a signal for oscillating the magnetic head for a predetermined period during the second step.

19. The control method according to claim 6, further comprising:
a third step of generating a position signal for the magnetic head from the data area of the magnetic disk medium.

20. The control method according to claim 6, wherein the first step positions the magnetic head at an arbitrary track on the magnetic disk medium and
the second step is performed in a space on the magnetic disk medium between sectors of the data area.

21. The control method according to claim 20, wherein the second step has a step of closing a write gate and a step of generating a signal for oscillating the magnetic head for a predetermined time (τ') while the write gate is closed.

22. The control method according to claim 18, further comprising:
a fourth step of closing a write gate also in a space between the servo information area and the data area.

23. A magnetic disk drive comprising:
a magnetic disk medium having a large number of tracks formed thereon, the tracks having a data area in which to write data used by a user and a servo information area having written therein servo information for positioning a magnetic head at a target location;
a magnetic head to read the servo information from the servo information area and write data in the data area;
an actuator to support and move the magnetic head;
a positioning circuit to produce a signal for driving the actuator to position the magnetic head at a target track;
a signal adding circuit to give a signal of a predetermined frequency to the actuator to oscillate the magnetic head when the magnetic head is in the data area; and
a circuit to generate a signal for correcting the position signal output from the positioning circuit according to a signal obtained by the magnetic head from the data area while the magnetic head is oscillated.

24. The magnetic disk drive according to claim 23, wherein the signal adding circuit outputs a voltage signal having a frequency between 10 kHz and 500 kHz.

25. The magnetic disk drive according to claim 23, wherein the magnetic head has an MR head and an inductive head and, when it is in the data area, operates the MR head to obtain a signal.

26. The magnetic head according to claim 25, further comprising a control unit to obtain the signal from the data area by the MR head parallelly with an operation of writing information in the data area by the inductive head.

27. A control method of a magnetic disk drive, wherein the magnetic disk drive positions a magnetic head on a magnetic disk medium having a large number of tracks formed thereon, the tracks having a data area in which to write data used by a user and a servo information area having written therein servo information for positioning the magnetic head at a target location; the control method comprising:
a first step of moving the magnetic head across the tracks toward a target track according to the servo information in the servo information area;
a second step of causing the magnetic head to execute a track-following operation along the target track;
a third step of applying oscillations to the magnetic head during the track-following operation;

a fourth step of generating a new position signal based on a signal obtained from the magnetic head as a result of the oscillations; and a fifth step of positioning the magnetic head at the target track according to the new position signal.

28. The control method according to claim 27, wherein the third step includes oscillating the magnetic head while the magnetic head is in the data area and obtaining a signal from the data area during the same period.

29. The control method according to claim 27, wherein the oscillations of the third step are produced by generating a voltage signal having a frequency between 10 kHz and 500 kHz.

30. A method of writing information to or reading information from a magnetic disk medium using a magnetic head, comprising:

a first step of rotating a magnetic disk medium, the magnetic disk medium having a large number of tracks formed thereon, the tracks having a data area in which to write data used by a user and a servo information area having written therein servo information for positioning the magnetic head at a target location;

a second step of moving the magnetic head across the tracks toward a target track according to the servo information in the servo information area;

a third step of causing the magnetic head to execute a track-following operation along the target track;

a fourth step of applying oscillations to the magnetic head during the track-following operation;

a fifth step of generating a new position signal based on a signal obtained from the magnetic head as a result of the oscillations;

a sixth step of positioning the magnetic head at the target track according to the new position signal; and a seventh step of writing information in or reading information from the data area of the track where the magnetic head is positioned.

* * * * *